Figure 1:
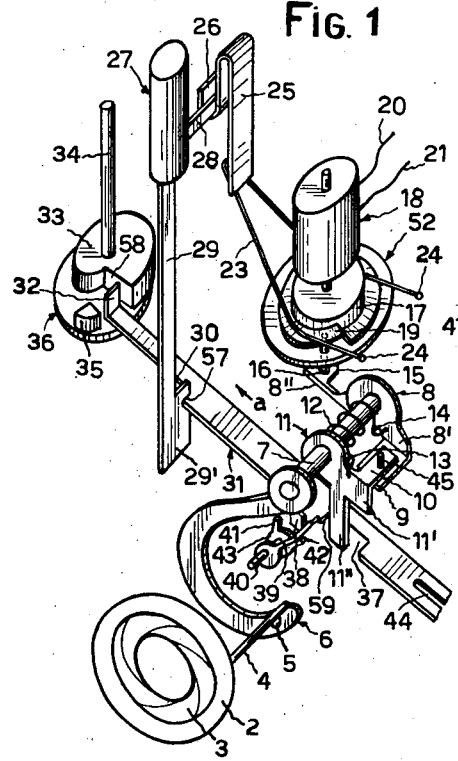

July 3, 1962 G. WERRMANN 3,041,950
CAMERA
Filed March 2, 1960 2 Sheets-Sheet 1

July 3, 1962     G. WERRMANN     3,041,950
CAMERA

Filed March 2, 1960     2 Sheets-Sheet 2

United States Patent Office 3,041,950
Patented July 3, 1962

3,041,950
CAMERA
Gerhard Werrmann, Nurnberg, Germany, assignor to Carl Braun Camerawerk, Nurnberg, Germany, a firm
Filed Mar. 2, 1960, Ser. No. 12,474
Claims priority, application Germany June 5, 1959
3 Claims. (Cl. 95—10)

My invention relates to improvements in photo-cameras, in particular small-picture cameras which may be actuated without manipulation of setting or adjusting members.

For the purpose of facilitating the operation of cameras, it is known to couple the diaphragm setting member and the shutter speed adjusting member inter se and also to a photo-electric exposure meter. It further is known to accommodate a range finding unit in the camera housing, which unit is coupled to the objective. To operate such cameras, it is necessary to manually actuate the diaphragm and shutter speed adjusting members, say until the meter pointer coincides with an associated follow-up pointer, and additionally to manipulate the range finding unit in known manner.

These manipulations are of disadvantage when using the camera, as they require on one hand relatively much time and, on the other hand, a substantial fabrication expenditure. It has been tried to eliminate the manipulation of setting and adjusting members by using a shutter which involves a fixed operating time, say 1/50 of a second, and by adjusting the diaphragm through a photo-electric meter. In such cameras, the diaphragm is constituted by two pivotable plane-parallel discs provided with wedge-shaped slots for the passage of light and which are movable relatively to each other to form openings of different size. Such cameras, however, are tainted by the disadvantage that the diaphragm discs require relatively large deflections and, thus, cannot be housed in a conventional tubular objective mount. Instead, said discs are accommodated in the substantially larger camera housing, which proves difficult and unfavorable in fabrication. Further, said diaphragm discs require larger adjustment paths than conventional iris diaphragms, which again proves to be of disadvantage with respect to the design and accommodation of the disc actuating means and in view of the time required.

The object of my invention is to provide means on cameras, in particular small-picture cameras comprising a tubular objective mount which projects forwardly from the camera housing, which means permit to actuate the camera without having to manipulate setting or adjusting members.

According to the invention a camera of this type comprises for such purpose the combination of a conventional short-focus (e.g. 40 millimeters) objective tube provided with an iris diaphragm, a shutter operable with a fixed time of say 1/50 of a second, and means for automatically setting the iris diaphragm by means of a photo-electric exposure meter disposed in the camera housing. It thus is possible to make the sharpness range start at a relatively short distance, say five feet from the camera, and it is no longer necessary to make adjustment for the distance between camera and object to be photographed. Further, measures for adjusting the shutter speed are eliminated, and the iris diaphragm does not any longer have to be adjusted. To make an exposure, the user of this camera, therefore, does not have to make any manipulations any more, save pointing the camera on to the object and to operate the trigger. Furthermore, the invention affords the possibility of using tubular objective mounts in which is housed an iris diaphragm so that the diaphragm mechanism now may be advantageously arranged outside of the camera housing. Thus also small-picture film cameras may now be made which are operable without requiring the manipulation of any setting or adjusting members. The removal of the diaphragm mechanism from the camera housing to the objective mount, is considered an essential feature of my present invention.

For the purpose of adjusting the iris diaphragm, the invention provides means for actuating an axial cam by the exposure meter, which is connected to the oscillatory meter part and is axially movable against spring action. A further provision is that said cam may be locked in the position of measurement by means of a trigger-controlled clamping or locking member such as a hingedly engageable spring element, e.g. a leaf spring, which upon actuation of the trigger coacts with said cam to engage same through the spring element in a non-rotatable and immovable relation to abutment faces which are fixed in the camera. To adjust the diaphragm to the cam position thus set, provision is made to render the cam engageable, for example by means of bell cranks pivoted to the camera housing, to the diaphragm adjusting ring. Said bell cranks may be brought into a terminal position, and locked therein, for example by means of a slide movable through the film-advancing lever, and may be freed from such terminal position through the trigger for the purpose of adjusting the diaphragm. By virtue of such a construction of meter and diaphragm or, respectively, of the gear provided between meter and diaphragm it is possible to bring the diaphragm adjusting ring into the open position of the diaphragm, while at the same time freeing the cam, by means of the film-advancing lever. Said cam under spring action thereby is raised clear of its abutment to play freely. When subsequently actuating the trigger which is connected to the cam and the actuating slide, the cam is locked and the diaphragm setting member is restored so that the bell crank connected to the diaphragm ring abuts against the cam. The diaphragm-opening size then is determined by the earlier or later abutment against the cam which has been adjusted by the meter but stopped by the trigger.

The invention further provides that said bell crank coacts with the cam through a pin which is parallel to the movable meter portion. The follow-up movement of the bell crank is facilitated by said pin, independently of the size of arc of the bell crank engaging said pin.

The invention further provides measures by which the shutter is triggered only when the diaphragm is moved from the terminal to the measuring position. To such end the shutter or the shutter tensing shaft respectively, is provided with a lever or the like which trips the shutter only after a certain lost motion.

One form of the invention is shown in the drawings, in which—

Figure 2:
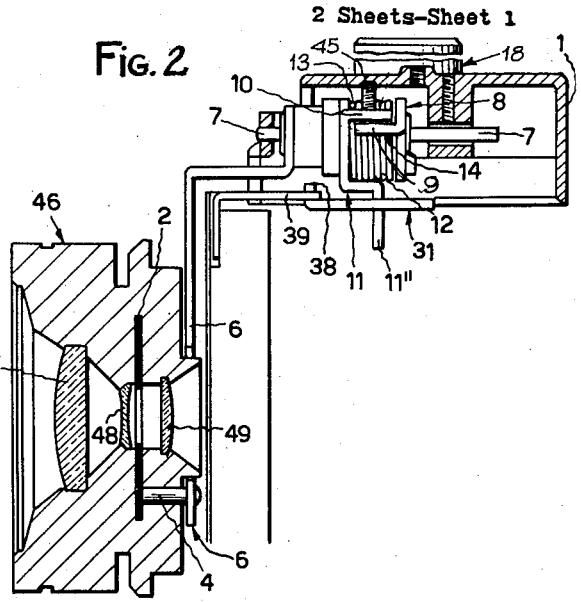
Figure 3:
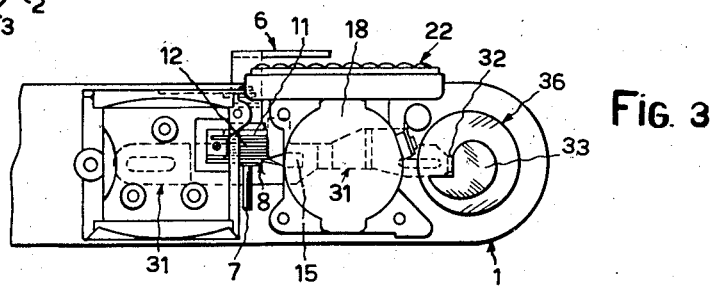
Figure 4:
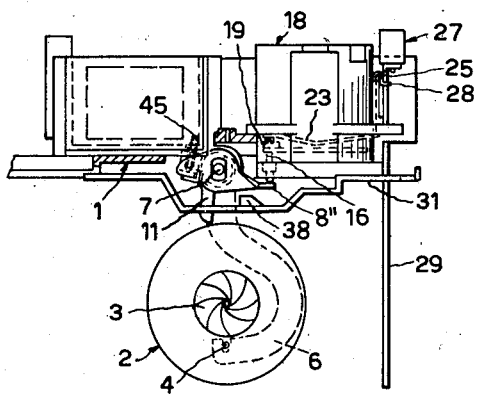
Figure 5:
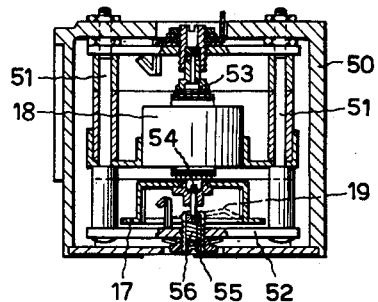
Figure 6:
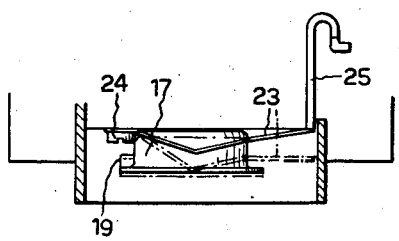
Figure 6A:
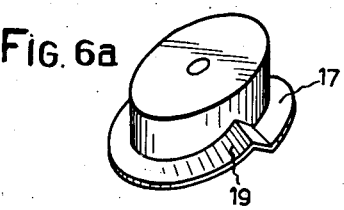
Figure 7:
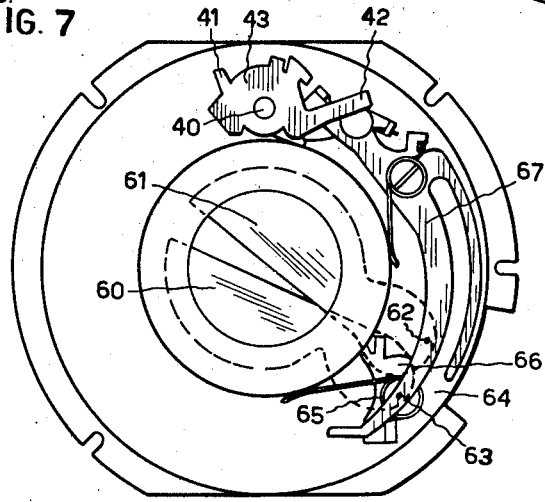

FIG. 1 is a schematic perspective view of the camera with the housing removed, FIG. 2 is a section on the optical axis, FIG. 3 is a bottom view of the camera, FIG. 4 is a rear view of the camera portion comprising the operating mechanism, FIG. 5 shows a section through a camera meter, FIG. 6 is a schematic illustration of the cam positions prior and subsequent, respectively, to the execution of a photographic exposure, FIG. 6a shows in perspective the cam, and FIG. 7 is a plan view of the shutter mechanism used.

In FIG. 1, the camera housing 1 has been omitted, but is shown in FIGS. 2 to 4. 2 is the operating ring of the curved diaphragm sectors 3 which constitute an iris diaphragm and which are disposed, in known manner, in the objective mount. To ring 2 is fixed the actuating pin 4 which is engaged in a recess 5 of an arm 6 which is fixed to an axle pin 7. The latter is journaled in the camera housing 1 and carries in fixed relation a three-arm or crank member 8. One arm of the latter is a lug 9 on which bears the lug 10 of a second three-arm or crank member 11 which is mounted freely turnable on pin 7. Member 11 forms one abutment of a helical spring 12 of which the end 13 bears from above on the arm 11' and of which the other end 14 abuts against the lower edge of the arm 8' of member 8.

Arm 8" of member 8 is integral with a lug 15 to which is secured a pin 16 which coacts with a cam 17 of the exposure meter 18. To such end, cam 17 comprises a sloping face 19 against which bears pin 16 from below. Meter 18 is electrically connected through lines 20 and 21 to the photocell 22 (FIG. 3). As shown in particular in FIG. 1, an angularly bent spring 23, which at 24 is secured to the camera housing, bears on cam 17 from above while its other end forms the abutment of a slider 25 in the fold 26 of which is engaged the lug 28 of a trigger 27. A downwardly extending flat part 29 of the trigger 27 is shouldered at 30. A longitudinally movable slider 31 through an end lug 32 coacts with a first cam 33 which is rotatable by means of a shaft 34 through a film-advancing lever (not shown). A second cam 35, which is actuable through lug 32, is fixed to a disc 36, together with cam 33. Slider 31 has a recess 37 in which is engaged arm 11" of member 11. Slider 31 further has a lug 38 which pivotally engages a finger 39 loosely mounted on the shutter tensing shaft 40. With finger 39 coact lugs 41 and 42 of a disc 43 which is fixed to shaft 40, so that finger 39 is movable between two terminal positions defined by its abutment against the two lugs 41 and 42, while shaft 40 is not rotated. In a guide slot 44 of slider 31 is engaged a cam (not shown) mounted on the camera housing 1.

The two members 8 and 11 are adjustable relatively to each other by means of a screw 45 which is engaged in lug 10. The diaphragm setting ring 2 is inserted in the objective tube 46 (FIG. 2) which comprises lenses 47 and 49.

FIGS. 2 to 6 show more concrete forms of the structural elements mentioned above. FIG. 1 shows essentially the arrangement of said elements in the camera housing and relatively to each other. In FIG. 5 is shown the exposure-meter housing 50 in a larger scale. Draw-in bolts 51 carry an abutment plate 52 for cam 17 which, as shown in FIG. 5, is connected to the rotatable meter part 53. The latter through a pin 54 is supported on a base plate 55 which against the action of a spring 56 is movable towards the camera interior until cam 17 is stopped by a plate 52. The downward movements of cam 17 are brought about by a spring 23, as shown in FIG. 6. In the latter, spring 23 is depicted by solid lines in its upper position, i.e. in its release position, and by dash-and-dot lines in its lower position, i.e. locking position. By moving slider 25 downwardly, spring 23 may be brought into the clamping or locking position in which it is pressed against cam 17 which in turn presses it also towards plate 52 against the action of spring 56.

FIGURE 7 shows a simple shutter mechanism having plates 60, 61 which are pivotally mounted at 62, 63, respectively, for movement relative to the shutter housing 64. The plates are pivoted by a common lever 65 which is likewise pivotable about the axis 63. This lever 65 carries an abutment 66 which is engaged by the lever 67, the latter being pivoted by the lever 43 which is carried by the shutter cocking shaft 40.

The camera functions as follows, it being assumed that the various driving or operating elements of the camera occupy the positions shown in FIG. 1.

Cam 17 is in its open position in which it can play freely in accordance with the light quantity incident on photocell 22. Spring 23 then is spaced from and situated above cam 17 and in turn holds slider 25 in its upper position. Also in its upper position is trigger 27, abutting through its widened lower end 29' against a shoulder 57 of slider 31 and holding the trigger tensed. Lug 32 then is situated between a plane face 58 of cam 33 and cam 35, thus preventing rotary movements of shaft 34, and serves as film-transport locking device. Slider 31 through its shoulder 59 abuts against arm 11" of member 11 and holds same in its triggering position against the action of spring 12 so that arm 8" of member 8 is in its lower position and pin 16 is disengaged from cam 17. Suitably a restoring spring such as a helical spring is mounted on pin 16 to hold the latter in the position shown in FIG. 1. Through axle pin 7, arm 6 also is held in a terminal position, whereby through pin 4 the diaphragm ring 2 is turned so far that the diaphragm opening or stop is of the maximum size possible, for example 5.6. Slider 31 through its lug 38 blocks finger 39 in the swing position shown, and said finger holds the shutter in the tensed position by its abutment against lug 42.

By depressing the trigger 27 for the purpose of making a photographic exposure, slider 25 is moved downwardly through lug 28 and through spring 23 presses cam 17 against abutment plate 52 which is fixedly located in the camera. At the same time, trigger portion 29' moves below slider 31 so that the latter now under the influence of spring force is movable in direction of the arrow $a$ in FIG. 1 until lug 32 abuts against the circumference of cam 33. When slider 31 moves over shoulder 30 of the trigger, the latter is held in its lower terminal position, and thus cam 17 is further held through slider 25 and spring 23 against abutment plate 52. Upon movement of slider 31, member 11 is released and performs a rotary clockwise movement and through the lugs 10 and 9 or, respectively, screw 45 swings member 8 until pin 16 abuts against the underside of the inclined face 19 of cam 17. During the swing movement of member 8, arm 6 through axle pin 7 also is moved clockwise and through pin 4 actuates the operating ring 2 of the objective diaphragm whereby the latter is moved from the open position shown in FIG. 1 into the closed position shown in FIG. 4. During the movement of slider 31 in direction of the arrow $a$ (FIG. 1) finger 39 through lug 38 is moved until said finger abuts against lug 41, and disc 43 through energy accumulators such as springs (not shown) is rotated counter-clockwise and through tensing shaft 40 actuates the shutter shown in FIG. 7.

In place of the arrangement of a shutter with a tensing axle pin or shaft, it is of course also possible to let disc 43 act directly for example on to an element pivoted to the camera housing, which element in turn performs the diaphragm opening and closing movements.

After an exposure has been made, slider 31 through rotation of axle pin 34 again is restored by cam 33 into the position shown in FIG. 1. Lug 32 then slides along the circumference of cam 33 and moves slider 31 in accordance with the varying radial distance between said cam 33 and the axis of rotation. By overriding shoulder 30, trigger 27 is freed and assumes the position shown in FIG. 1 in which slider 25 is released so that spring 23 also occupies the position shown in FIG. 1. Thereby cam 17 is released and can play freely. Shoulder 59 of slider 31 at the same time abuts against arm 11" and moves member 11 counter-clockwise whereby member 8 and arm 6 are moved back to the position shown and diaphragm setting ring 2 is moved so far that the diaphragm occupies the position shown in FIG. 1.

What I claim as new and desire to secure by Letters Patent is:

1. In a photographic camera, the combination which comprises: a film advancing device; a shutter cocking shaft; a slide member interposed between said film advancing device and said shutter cocking shaft; a diaphragm having an adjusting member which is movable into an end position by said slide member when the latter is moved under the influence of said film advancing means; a shutter release device operatively associated with said slide member; a photo-electric measuring device having a rotatable component the position of which is dependent on the amount of light being measured; and means for automatically setting said adjusting member of said diaphragm, said means including an axially extending control cam carried by said rotatable component of said photo-electric measuring device, blocking means operatively associated with said shutter release device and said rotatable component for blocking movement of the latter, and said control cam carried thereby, upon actuation of said shutter release device, and a lever system connected to said adjusting member and being pivoted by said slide member, said lever system having a feeler which engages said control cam while the latter is blocked, whereby upon actuation of said shutter release device said control cam will be held in the position it occupies at the moment and said adjusting member of said diaphragm will be set into a position corresponding to the light conditions as measured by said photo-electric measuring device while said control cam thereof is held in a blocked condition.

2. The combination as defined in claim 1 wherein said control cam is mounted on said rotatable component for axial movement relative thereto and wherein said blocking means comprise stationary surface means and spring means actuated by said shutter release device for pressing said control cam against said stationary surface means when said shutter release device is actuated.

3. The combination defined in claim 1 wherein said feeler comprises a pin carried by said lever system, said pin extending in the direction of the axis of said rotatable component of said photo-electric measuring device.

References Cited in the file of this patent

UNITED STATES PATENTS

| | | |
|---|---|---|
| 2,061,909 | Karg | Nov. 24, 1936 |
| 2,148,963 | Rauch | Feb. 28, 1939 |
| 2,188,820 | Riszdorfer | Jan. 30, 1940 |
| 2,206,626 | Blechner | July 2, 1940 |
| 2,838,985 | Burger | June 17, 1958 |
| 2,930,282 | Herterich | Mar. 29, 1960 |
| 2,940,046 | Herterich | June 7, 1960 |

FOREIGN PATENTS

| | | |
|---|---|---|
| 806,416 | France | Sept. 21, 1936 |